June 27, 1967

F. L. DIMMICK ET AL 3,328,113

NIGHT VISION TESTING DEVICE

Filed May 11, 1962

INVENTORS.
FORREST L. DIMMICK
JO ANN SMITH KINNEY
BY
Edward H Costigan
ATTORNEY

INVENTORS.
FORREST L. DIMMICK
JO ANN SMITH KINNEY
BY

Edward F. Costigan
ATTORNEY

LEGEND
① = .039 DIAM. IN INCHES
② = .031 " "
③ = .0225 " "
④ = .0465 " "
⑤ = .055 " "

June 27, 1967  F. L. DIMMICK ET AL  3,328,113
NIGHT VISION TESTING DEVICE
Filed May 11, 1962  5 Sheets-Sheet 5

SENSITIVITY DIFFERENCES IN THE FIELD OF THE DARK ADAPTED EYE

INVENTORS.
FORREST L. DIMMICK
JO ANN SMITH KINNEY
BY
Edward F. Costigan
ATTORNEY

United States Patent Office 3,328,113
Patented June 27, 1967

3,328,113
NIGHT VISION TESTING DEVICE
Forrest L. Dimmick, New London, and Jo Ann S. Kinney, Mystic, Conn., assignors to the United States of America as represented by the Secretary of the Navy
Filed May 11, 1962, Ser. No. 194,203
1 Claim. (Cl. 351—17)

The invention described herein may be manufactured and used by or for the Government of the United States of America for governmental purposes without the payment of any royalties thereon or therefore.

This invention relates to the evaluation of night vision and particularly to an apparatus for use in testing the night vision of an individual.

Night vision may be defined as the ability of an individual to see a small target at different brightness levels against a completely black background: In recent years, it was found that night visibility varied according to the size and brightness of the target and part of the visual field used to view it. It was then determined that size and brightness of the target were interchangeable in evaluating the night vision sensitivity of an individual, and that observing distance was not a variable. More recently, the scotopic sensitivity of the dark adapted eye was explored at points having various degrees of eccentricity in each of four quadrants of the visual field for a number of viewers. From this data, it was possible to develop a representative picture of the overall night vision sensitivity for each of the individual viewers. After a great number of tests, a contour map was developed which represented a picture of the night vision sensitivity of the entire group under study. It was shown by means of these developments that the overall scotopic sensitivity of the individual viewer followed a general pattern but that there existed specific differences in scotopic sensitivity between individual viewers.

This type of analysis confirmed the theory that night vision is a complex subject. It also confirmed the fact that none of the individual devices heretofore used gave either a quantitative or qualitative analysis of the total night vision of the individuals who were tested. The representative maps which were developed reaffirmed the well known fact that a person is scotopically blind within five degrees of the central fixation point. These maps showed that sensitivity in the nasal field outside of the parafoveal region is higher and more uniform than in any other field. They also indicated that the sensitivity in the lower and upper fields of the parafoveal region is greater than in the nasal and temporal field and that the central scotama is flattened out on the vertical axis. Sensitivity in the upper field, as shown in the maps, exhibited a drop of about seven to eight degrees from the central fixation point. This decrease was attributed to the eyelashes which form a fringe across the upper part of the pupil at this position and act as a light filter at and beyond this point. It was also found that a blind spot exists in the temporal field at about 15° from the central fixation point.

There were several devices developed during the war for the purpose of evaluating night vision but each, in turn, only evaluated an isolated factor of the whole complex subject. Later studies of many of the devices yielded results which were not significant in evaluating the overall night vision of the individual viewer. Therefore, a need existed for an apparatus which might be used by medical officers, psychologists and ophthalmologists to evaluate personnel for duties requiring good night vision.

The subject apparatus can be used to measure the scotopic sensitivity of the dark adapted eye with speed and accuracy. The device is used to measure the scotopic sensitivity of the eye to various size stimuli of constant brightness at various positions in the visual field. In this way, a representative picture or profile of the viewer's scotopic sensitivity can be developed from the data obtained at the various retinal positions. In addition, although an averaging of the data obtained from a group of viewers yields the same map of retinal sensitivity, it has been found that there are significant individual differences not only in the over-all levels of sensitivity, but also in the profiles obtained. This device is based on several basic principles which have been recently proven to be important in evaluating the scotopic sensitivity of an individual. For instance, the sensitivity of the eye to dim light varies throughout the retina, being poorest at the fovea, increasing to a peak at 10 to 15° from the fovea, and then decreasing gradually to the extreme periphery. In addition, sensitivity is not uniform throughout the various quadrants of the visual field, the nasal field, i.e. the temporal retina, giving the most sensitive measures. To evaluate an individual's sensitivity properly, it is thus necessary to test him at various locations in the visional field and to give him a score compiled from these various measures. This is what the present device accomplishes.

In general, the subject device comprises, in combination:
(a) An outer enclosure having a face containing a central opening and a plurality of secondary openings distributed in spaced relationship around the central opening; (b) an inner enclosure housed within the outer enclosure, the inner enclosure having a face containing a plurality of openings in substantial alignment with the corresponding openings in the outer enclosure; (c) a plate containing a predetermined pattern of holes rotatably mounted between the inner and outer enclosure; (d) an intermittently actuated light housed within the inner enclosure; and (e) a second light positioned over the central opening on the face of the outer enclosure.

The principal object of this invention is to provide an apparatus adapted for use in the evaluation of the night vision sensitivity of the dark adapted eye.

Another object is to provide an apparatus adapted for use in differentiation of individuals according to their night vision sensitivity.

A further object is to provide an apparatus of low fabrication and maintenance cost, light weight, high durability and adapted for use under a wide variety of service conditions.

Other objects and many of the attendant advantages of this invention will be readily appreciated as the same becomes better understood by reference to the following detailed description when considered with the accompanying drawings, in which FIG. 1 is a perspective view of the present apparatus with a section cut away showing the assembly within the interior of the apparatus;

Similar numerals refer to similar parts throughout the several views.

Figure 1:
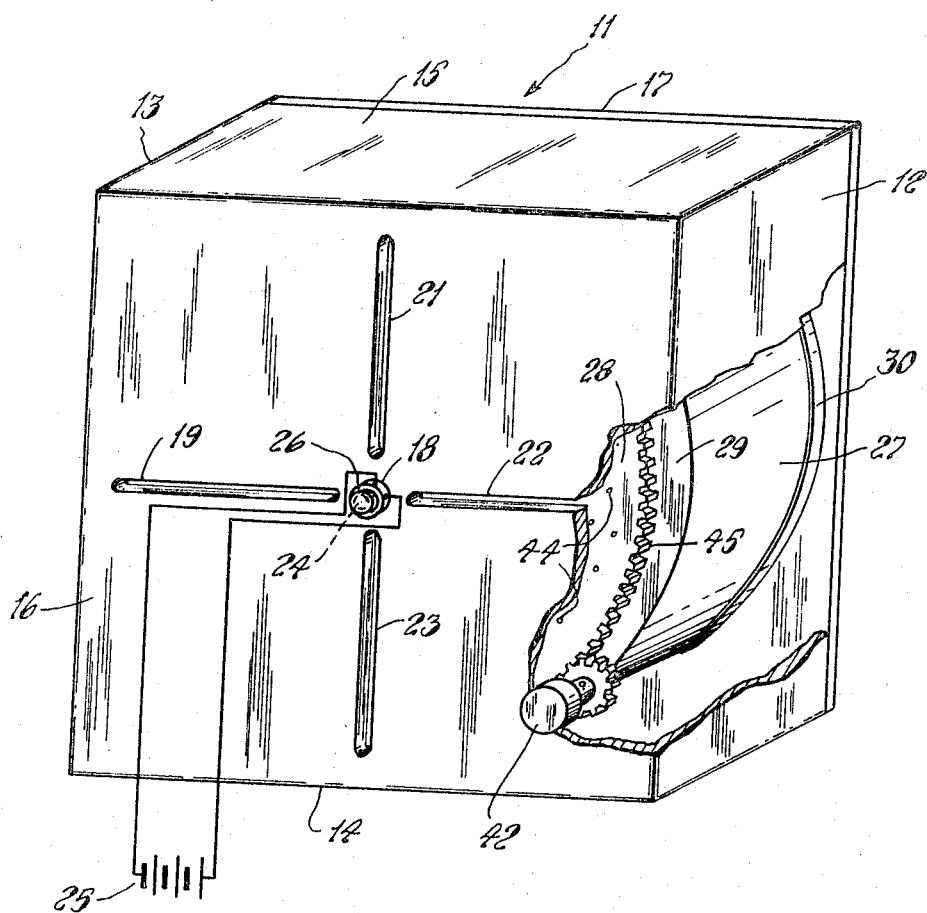

The subject device, as shown in FIG. 1, is provided with an outer housing in the form of a box 11 having two vertical sides 12 and 13, two horizontal sides 14 and 15, a front panel 16, and a detachable rear panel 17 which serves to provide ingress into the box 11.

The front panel 16 is provided with a central opening 18 and a plurality of secondary openings distributed in spaced relationship around the central opening 18. The exact positioning of the secondary openings on the front panel 16 depends to a large extent upon the exact area of the visual field that is desired to be explored. In the preferred embodiment, as shown, the plurality of secondary openings are in the form of slots or elongated openings 19, 21, 22 and 23. The longitudinal axis of the individual elongated openings lie at 0°, 90°, 180°, and 270° with respect to the central axis of the opening 18. In this case, each of the elongated openings extends from the area adjacent the central opening 18 to the area adjacent the outer edge of the front panel 16.

The central opening 18 in the front panel 17 is provided with a light source 24 in circuit with a power source 25 as shown. The light source 24 is provided with a deep red filter 26 and serves as a fixation-point for the viewer.

Figure 2:
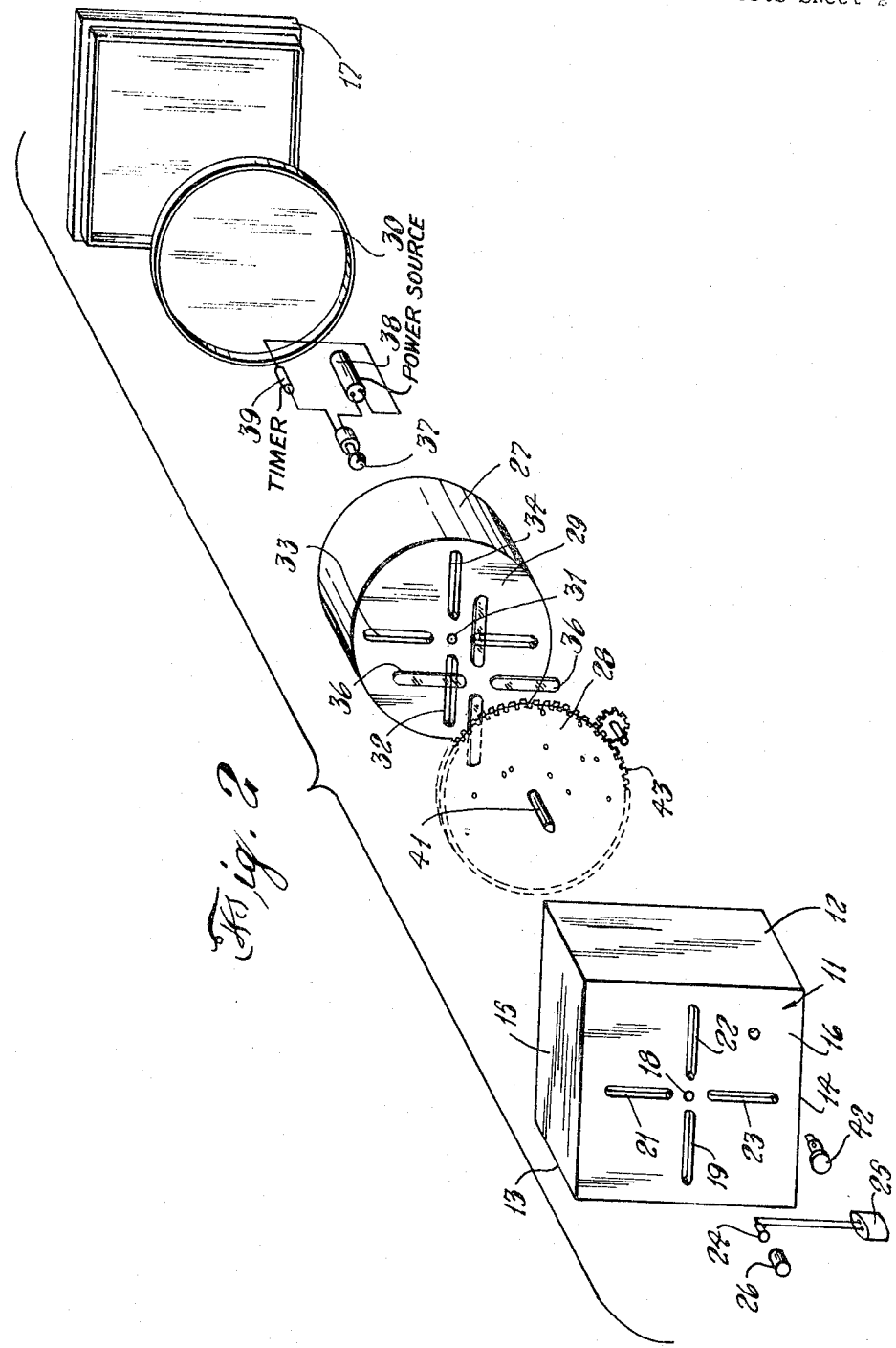
FIG. 2 is an exploded view of a preferred embodiment thereof.

The box 11 serves to house an inner enclosure in the shape of a cylinder 27 and a circular wheel 28. The cylinder 27 is provided with a cylindrical face 29 and a detachable rear cover 30 which provides ingress into the body of the cylinder 27. The cylinder, when housed within the box 11, is substantially in axial alignment with the longitudinal axis of the central opening 18 in the front panel 16. As shown in FIG. 2, the cylindrical face 29 is provided with a plurality of openings in substantial alignment with the corresponding openings in the front panel 16 of the box 11. The cylindrical face 29 is provided with a central opening 31 and four slots or elongated openings 32, 33, 34, and 35. Each of the elongated openings is provided with a neutral filter and a color compensating filter. These filters 36 produce a field of approximately equal brightness of 5.5 log $\mu\mu$L and 2042° K. The longitudinal axis of the elongated openings lie at 0°, 90°, 180°, and 270° with respect to the control axis of opening 31. In all cases, the positioning of the openings in the cylinder 27 depends on the positioning of the corresponding openings in the box 11.

Figure 3:
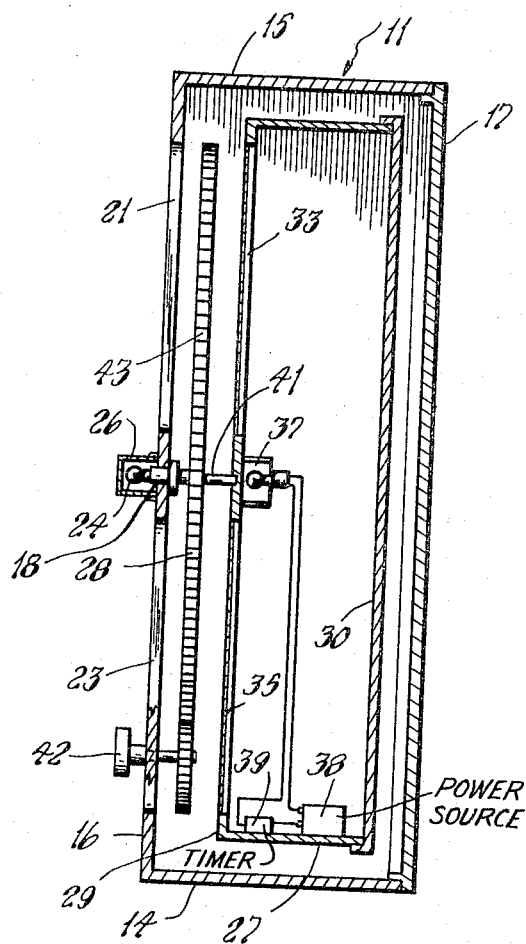
FIG. 3 is a section taken on the line 3—3 of FIG. 1.

The cylinder 27, as shown in FIG. 3, houses a power source 38 and a timing mechanism 39 for intermittent activation of the light source 37. The power source 38 and the timing mechanism 39 may be either externally located with respect to the apparatus or housed within the cylinder itself 27. The light source 37, a miniature incandescent lamp, may be activated for a one second exposure by a 1½ volt battery connected to a timer.

Figure 4:
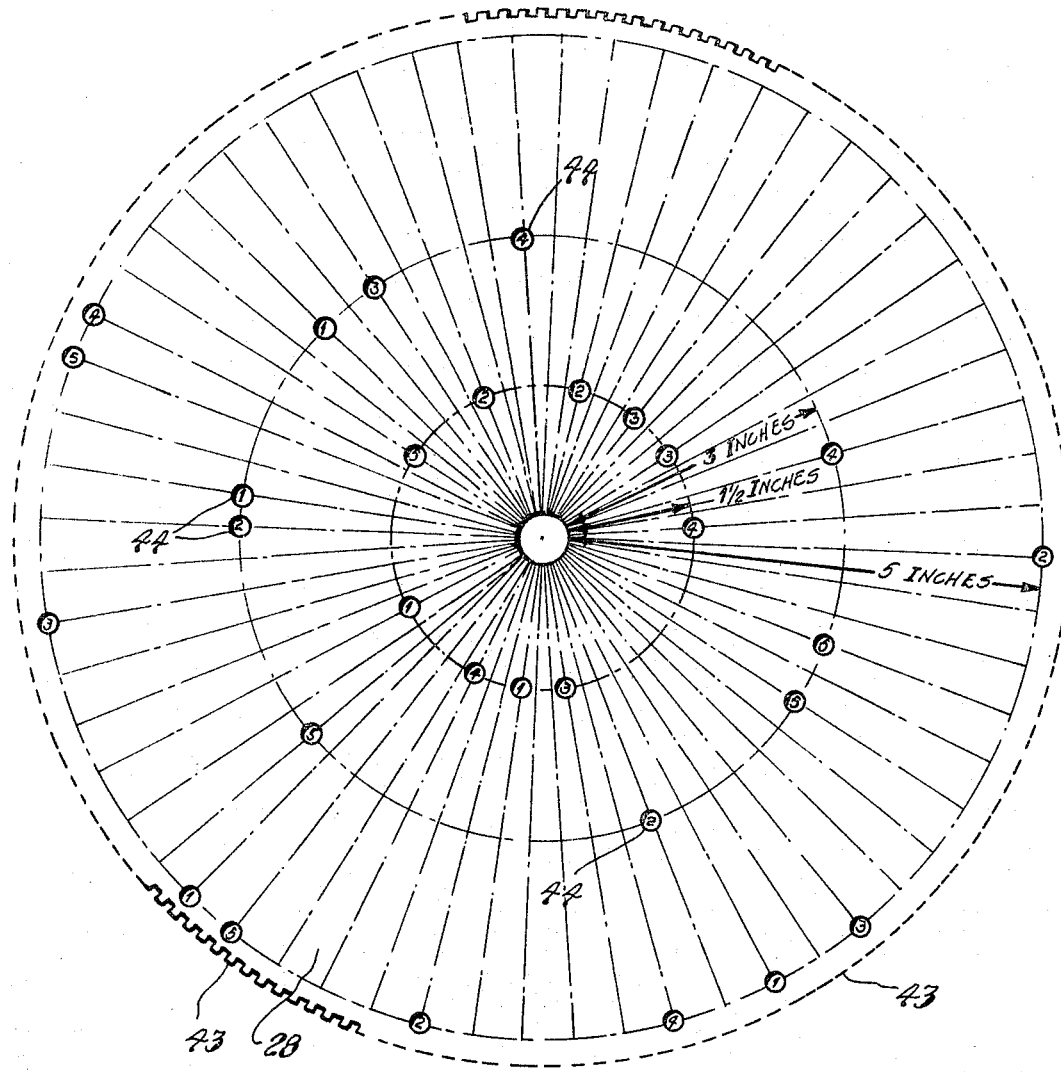
FIG. 4 is a front view of a plate element of the apparatus.

The circular plate 28 as shown in FIG. 3, is rotatably mounted on an axle 41 intermediate the front panel 16 of the box 11 and the face 29 of the cylinder 27 in such a manner that circular plate 28 is in axial alignment with the central opening 18 in the front panel 16. The circular plate is adjustably controlled by means of a knob 42 which is in operative association with the notches 43 on the plate 28. As shown in FIG. 4 the body of the plate 28 is provided with a plurality of holes 44 while the periphery of the wheel is provided with a plurality of notches 43. The holes 44 are positioned on the plate 28 in a pattern allowing any two of the holes of equal diameter to be in substantial alignment with the secondary openings on the front panel 16 at a given position of the plate 28 on the axle 41. The holes 44 totaling thirty in number are divided into three equal sets. Each set of holes consists of an equal quantity of holes having diameters of 0.0225, 0.031, 0.039, 0.0465 and 0.055 inch. It has been found that holes of the aforesaid sizes subtend visual angles of 0.090°, 0.124°, 0.156°, 0.186° and 0.220° at a viewing distance of 14.3 inches from the front panel 16 of the box 11. As shown in FIG. 2, there is a set of holes 44 distributed along each of three circumferential lines drawn at a distance of 1.5, 3.0, and 5.0 inches from the central axis of the plate 28. These lines have visual angles of 6°, 12°, and 20° at a viewing distance of 14.3 inches from the front panel 16. The holes are positioned on their respective circumferential lines in such a manner that any two holes of the same diameter do not lie on the same radius of the plate 28. However, any two holes of the same diameter on two different circumferential lines are positioned on plate 28 in such a manner that the radii on which they lie have an interval therebetween of either 90° or 180°.

In operation, the apparatus is placed in a black booth which shields the subject from light. The subject is dark adapted for twenty minutes before testing. A chin-rest is provided for the subject at a distance of 14.3 inches from the central fixation point. The examiner sits on the opposite side of the booth, screened from the subject; he presents the stimuli and records responses. The apparatus is used to test twelve positions in the visual field. These are located at 6°, 12°, and 20° above, below, to the right and to the left of the central fixation point. The subject is told that he may seen one or both of the spots and is instructed to report where he has seen the spots in terms of "up," "down," "right," or "left." The subject controls the exact position of the circular plate within the apparatus by means of a knob. In one complete revolution of the circular plate, each of five different size stimuli is presented twice at each of twelve positions. Two spots of light of the same size are shown on each trial in different quadrants; in this way, 120 stimuli are presented in 60 trials. The entire test has been found to take less than 15 minutes excluding the time allocated to dark adapting the subject's eyes.

Figure 5:
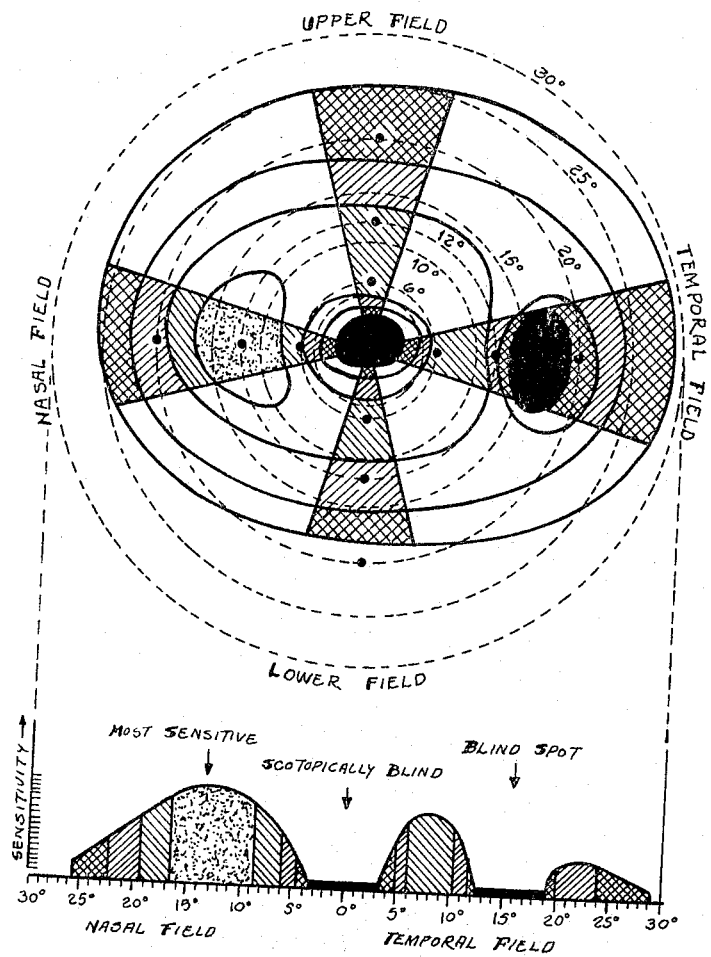
FIG. 5 is a contour map of the visual field, illustrating the sensitivity of the dark adapted eye in various segments of the field.

FIG. 5 is a contour map which shows the estimated distribution of size sensitivity over a portion of the scotopic visual field. Increasing sensitivity has been indicated by increasing lightness of shading. The black dots, which appear on the map at 6°, 12° and 20°, represent the points in the visual field at which the scotopic sensitivity of a subject is investigated through the use of the present apparatus. The points are located at the rise of the scotopic sensitivity curve, near the peak of the curve, and beyond the peak where the curve is falling. As is apparent, the visual field is explored at points having various degrees of eccentricity in each of four quadrants, all chosen to yield a representative sample of the total sensitivity of the subject under test. From this data, representative profiles may be developed for the subject in each of the four quadrants which, when combined, will represent his overall scotopic sensitivity.

Obviously, many modifications and variations of the present invention are possible in the light of the above teachings. For instance, the present apparatus may be slightly altered in order to test scotopic sensitivity in areas of the visual field other than those bordering on the vertical or horizontal axis. This may be accomplished by altering the positions of the secondary openings on the face of the outer housing followed by an alignment of the corresponding openings in the inner housing. Also, if desired, the number of stimuli presented may be varied or their position with respect to each other and with respect to the central fixation point may be changed. This is accomplished by merely changing the pattern of the holes on the circular plate within the apparatus. It is therefore to be understood that within the scope of the appended claim, the invention may be practiced otherwise than as specifically described.

We claim:

A device for use in testing night vision sensitivity which comprises, in combination,
  a box having two vertical sides, two horizontal sides, a front panel and a rear panel,
    said front panel having a central opening and four elongated openings whose longitudinal axes lie at 0°, 90°, 180°, and 270° with respect to the central axis of said central opening,
      each of said elongated openings extending from the area adjacent said central opening to the area adjacent the outer edge of said front panel;

a cylinder of closed end construction housed within said box in substantially axial alignment with said central opening in said front panel,
  said cylinder having a central opening and four elongated openings corresponding to and in substantial alignment with the corresponding openings in said front panel,
    said elongated openings in said cylinder provided with filters and color compensating means;
a circular plate containing a plurality of peripheral notches and a plurality of body holes rotatably mounted between said front panel and said cylinder,
  said plate in substantially axial alignment with said central opening in said front panel and said cylinder,
    ten of said body holes representing an equal quantity of five sizes having a diameter of 0.0225, 0.031, 0.039, 0.0465, and 0.055 inch distributed along each of three circumferential lines drawn at a distance of 1.5, 3.0, and 5.0 inches from the central axis of said circular plate,
      any two of said holes having an equal diameter positioned on two of said circumferential lines lying on different radii of said plate;
a primary light source positioned within said cylinder in circuit with a power source and a timing mechanism for intermittent activation of said light source;
light source for fixation provided with a filter positioned over said central opening in said face of said front panel, and
  means in operative association with said peripheral notches on said plate for the adjustable positioning of said plate within said box.

References Cited

UNITED STATES PATENTS 2,124,229   7/1938   Ferree et al. _____ 88—20

OTHER REFERENCES

Kinney, Calculated Effect of the Color Temperature of Stimulous on Isotopic Thresholds, Journal of the Optical Society of America, December 1956, vol. 46, pp. 1093–1094.

Wald, A Portable Visual Adaptometer, Journal of the Optical Society of America, March 1941, vol. 31, pp. 235–238.

JEWELL H. PEDERSEN, *Primary Examiner.*

DAVID H. RUBIN, *Examiner.*

T. L. HUDSON, J. K. CORBIN, *Assistant Examiners.*